United States Patent
Kang

(10) Patent No.: US 9,002,735 B2
(45) Date of Patent: Apr. 7, 2015

(54) ONLINE BUYBACK SYSTEM

(76) Inventor: In-Gu Kang, Gangwon-do (KR)

( * ) Notice: Subject to any disclaimer, the term of this patent is extended or adjusted under 35 U.S.C. 154(b) by 1744 days.

(21) Appl. No.: 11/918,000

(22) PCT Filed: Jun. 21, 2006

(86) PCT No.: PCT/KR2006/002377
§ 371 (c)(1), (2), (4) Date: Dec. 18, 2007

(87) PCT Pub. No.: WO2006/137682
PCT Pub. Date: Dec. 28, 2006

(65) Prior Publication Data
US 2010/0217683 A1     Aug. 26, 2010

(30) Foreign Application Priority Data

Jun. 22, 2005 (KR) .................. 10-2005-0053861
Oct. 28, 2005 (KR) .................. 10-2005-0102160

(51) Int. Cl.
| | | |
|---|---|---|
| G06Q 30/00 | (2012.01) | |
| G06Q 40/00 | (2012.01) | |
| G06Q 30/06 | (2012.01) | |

(52) U.S. Cl.
CPC ............ *G06Q 30/06* (2013.01); *G06Q 40/12* (2013.12); *G06Q 30/0601* (2013.01)

(58) Field of Classification Search
USPC ........................................ 705/26.1
See application file for complete search history.

(56) References Cited

U.S. PATENT DOCUMENTS

| | | | |
|---|---|---|---|
| 2002/0019785 A1* | 2/2002 | Whitman .................. | 705/28 |
| 2004/0073510 A1 | 4/2004 | Logan | |
| 2005/0193286 A1* | 9/2005 | Thatte et al. .................. | 714/48 |
| 2010/0042488 A1* | 2/2010 | McClung, III ............. | 705/14.13 |
| 2010/0235290 A1* | 9/2010 | Junger et al. .................. | 705/304 |
| 2011/0106714 A1* | 5/2011 | Junger .......................... | 705/304 |

FOREIGN PATENT DOCUMENTS

| | | |
|---|---|---|
| JP | 2003-281398 | 10/2003 |
| JP | 2004-227428 | 8/2004 |
| JP | 2006-510070 | 3/2006 |
| KR | 2000-50017 A | 8/2000 |
| KR | 1020010096400 A | 11/2001 |
| KR | 2003-039619 A | 5/2003 |
| KR | 1020040109975 A | 12/2004 |
| KR | 2005-19605 A | 3/2005 |
| WO | 03/073341 A1 | 9/2003 |

* cited by examiner

*Primary Examiner* — Mila Airapetian
(74) *Attorney, Agent, or Firm* — Revolution IP, PLLC

(57) ABSTRACT

An online buyback system is provided, including: a database storing product sale information including product identification information, product specification, product sale price, and product, sale date; a buyback request information receiving unit receiving buyback request information including product identification information from a computer of a buyback requester accessing a network; a sale checking unit referring to the product sale information stored in the database to check whether or not a product corresponding to the product identification information contained in the buyback request information has been sold; and a buyback processing unit processing such that the product corresponding to the product identification information is collected from the buyback requester when the product is determined to have been sold, and a buyback price of the product is paid to the buyback requester based on a time interval from the product sale date to buyback request date.

39 Claims, 2 Drawing Sheets

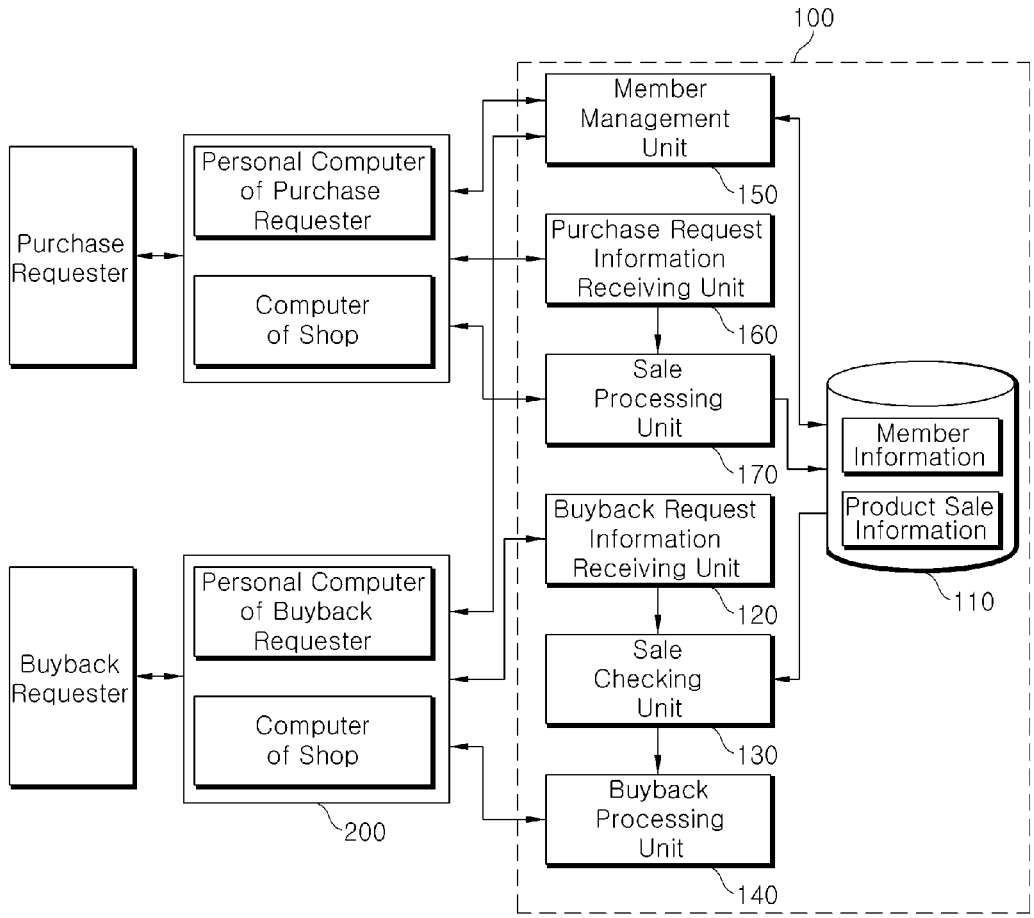

| Product Identification Information  C1 | A0001 |
| --- | --- |
| Product Sale Date  C2 | January 1, 2005 |
| Expiry Date  C3 | January 1, 2007 |
| Product Sale Price  C4 | ₩1,000,000 |
| Raw Material Price of Product  C5 | ₩500,000 |
| Value Increase Rate of Product  C6 | 4% |
|  |  |
| Buyback Request Date | January 1, 2006 |
| Buyback Price Before Expiry Date | ₩750,000 |
|  |  |
| Buyback Request Date | January 1, 2007 |
| Buyback Price On Expiry Date | ₩1,000,000 |
|  |  |
| Buyback Request Date | January 1, 2008 |
| Buyback Price After Expiry Date | ₩1,020,000 |

ONLINE BUYBACK SYSTEM

CROSS REFERENCE TO RELATED APPLICATIONS

The present application is the U.S. national stage application of International Application PCT/KR2006/002377, filed Jun. 21, 2006, which international application was published on Dec. 28, 2006 as International Publication WO 06/137682. The International Application claims priority of Korean Patent Application 10-2005-0053861, filed Jun. 22, 2005 and Korean Patent Application 10-2005-0102160, filed Oct. 28, 2005.

TECHNICAL FIELD

The present invention relates to an online buyback system.

BACKGROUND ART

The term 'buyback' implies an act or instance of repurchasing products that one previously sold or owned. Buyback is useful on transaction of products such as precious metals or antiques that will not considerably fall in price even after a long time.

However, there is a problem in that a buyback process of products such as precious metals or antiques has limitations in terms of time and space since a product purchaser and a product seller need to meet each other to conduct the buyback process.

DISCLOSURE OF INVENTION

Technical Solution

The present invention provides an online buyback system that allows a buyback process to be performed between sellers and purchasers of products, such as precious metals or antiques, with no limitations in terms of time and space.

Advantageous Effects

According to the present invention, the online buyback system allows an online buyback process to be performed between sellers and purchasers of products, such as precious metals or antiques, with no limitations in terms of time and space. In addition, after purchasing rare products such as precious metals or antiques, customers can be rewarded at a reasonable buyback price. Further, straight transactions of rare products such as precious metals or antiques can be conducted.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram of an online buyback system according to an embodiment of the present invention;

FIG. 2 is a table for showing a method of calculating product buyback price in an online buyback system according to an embodiment of the present invention.

BEST MODE FOR CARRYING OUT THE INVENTION

Figure 3:
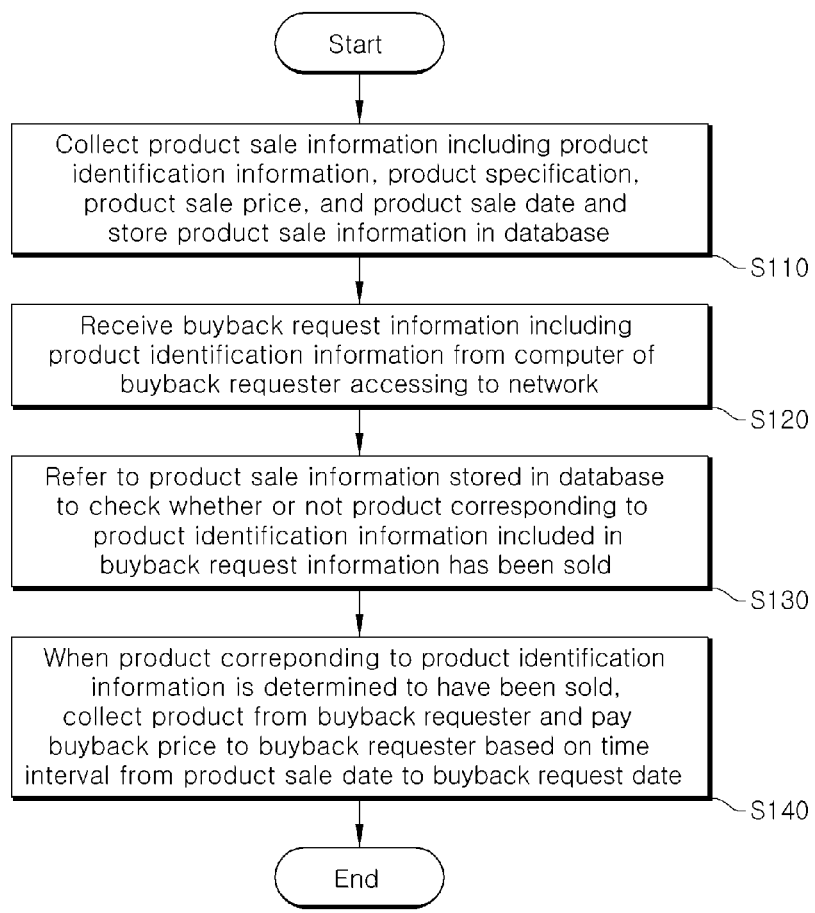
FIG. 3 is a flow chart of product buyback operation in an online buyback system according to an embodiment of the present invention.

According to an aspect of the present invention, there is provided an online buyback system including: a database storing product sale information including product identification information, product specification, product sale price, and product sale date; a buyback request information receiving unit receiving buyback request information including product identification information from a computer of a buyback requester accessing a network; a sale checking unit referring to the product sale information stored in the database to check whether or not a product corresponding to the product identification information contained in the buyback request information has been sold; and a buyback processing unit processing such that the product corresponding to the product identification information is collected from the buyback requester when the product is determined to have been sold, and a buyback price of the product is paid to the buyback requester based on a time interval from the product sale date to buyback request date.

MODE FOR THE INVENTION

Exemplary embodiments in accordance with the present invention will now be described in detail with reference to the accompanying drawings.

FIG. 1 is a block diagram of an online buyback system according to an embodiment of the present invention.

An online buyback system 100 includes a database 110, a buyback request information receiving unit 120, a sale checking unit 130, and a buyback processing unit 140.

The database 110 stores product sale information including product identification information, product specification, sale price, and sale date.

The online buyback system 100 collects product sale information concerning precious metals, antiques, and other products sold online or offline and stores it in the database 110. The product sale information includes product identification information, product specification, sale price, sale date, and the like.

The buyback request information receiving unit 120 receives buyback request information including product identification information from a computer 200 of a buyback requester accessing a network. The computer 200 may be a personal computer or a computer of a shop (franchise shop) that allows users to input the product identification information.

For instance, when a customer purchases a precious metal or antique and then changes it to a newer model or buy it back, the customer or buyback requester accesses the online buyback system 100 through his or her own computer 200 and makes a buyback request. The online buyback system 100 provides a user interface to the computer 200 so that the buyback requester can input buyback request information containing product identification information, and receives the buyback request information through the user interface. The buyback request information may be received by the buyback request information receiving unit 120 of the online buyback system 100 through and stored in the database 110.

The sale checking unit 130 refers to product sale information stored in the database 110 to retrieve whether or not a product corresponding to product identification information contained in the buyback request information received by the buyback request information receiving unit 120 has been sold.

That is, when the buyback request information is received by the buyback request information receiving unit 120, the online buyback system 100 refers to product sale information stored in the database 110 by means of the buyback request information receiving unit 120 to retrieve whether or not a product corresponding to product identification information contained in the buyback request information has been sold.

When the product corresponding to the product identification information has been sold, the buyback processing unit 140 processes such that the product is collected from the buyback requester and a buyback price is paid to the buyback requester based on a time interval from product sale date to buyback request date.

That is, when the product is determined by the sale checking unit 130 to have been sold, the buyback processing unit 140 of the online buyback system 100 processes such that the product is collected from the buyback requester and a buyback price is paid to the buyback requester based on a time interval from product sale date to buyback request date, thereby performing an online buyback process between sellers and purchasers of products, such as precious metals or antiques, with no limitations in terms of time and space.

The buyback processing unit 140 may pay a buyback price to the buyback requester based on comparison between a time interval from product sale date to buyback request date and a predetermined expiry date.

The buyback price is divided into a refund before expiry date, a refund on expiry date, and a refund after expiry date. The buyback price may be determined by a buyback rate or 'main/sub raw material price of product'.

The buyback rate may vary according to a time interval from product sale date to buyback request date. For instance, the buyback rate is set to be lower if the time interval is short, and it is set to be higher if the time interval is long.

If the time interval is shorter than a predetermined expiry date, the buyback processing unit 140 may be configured such that 'product sale price×buyback rate less than 100%', i.e., a smaller amount of money than the product sale price, is paid as the buyback price.

If the time interval is equal to the predetermined expiry date, the buyback processing unit 140 may be configured such that 'product sale price×buyback rate of 100%', i.e., the same amount of money as the product sale price, is paid as the buyback price.

If the time interval is longer than the predetermined expiry date, the buyback processing unit 140 may be configured such that 'product sale price×buyback rate more than 100%', i.e., a larger amount of money than the product sale price, is paid as the buyback price.

Meanwhile, if the time interval from the product sale date to the buyback request date is shorter than a predetermined expiry date, the buyback processing unit 140 may be configured such that the buyback price amounts to '((product sale price−main/sub raw material price of product)×time interval from product sale date to buyback request date÷time interval from product sale date to expiry date)+main/sub raw material price of product'.

If the time interval is equal to a predetermined expiry date, the buyback processing unit 140 may be configured such that the buyback price amounts to '((product sale price−main/sub raw material price of product)+main/sub raw material price of product×time interval from product sale date to buyback request date÷time interval from product sale date to expiry date)'.

If the time interval is larger than a predetermined expiry date, the buyback processing unit 140 may be configured such that the buyback price amounts to 'product sale price+((product sale price−main/sub raw material price of product)×value increase rate (%) of product÷365×time interval from expiry date to buyback request date)'.

FIG. 2 is a table for showing of a method of calculating product buyback price in an online buyback system according to an embodiment of the present invention. It is assumed that a product has a product identification number C1 of 'A0001' product sale date C2 is Jan. 1, 2005, buyback expiry date C3 is Jan. 1, 2007, product sale price C4 amounts to ₩1,000,000, main/sub raw material price C5 of the product amounts to ₩500,000, and value increase rate C6 is 4%.

If the time interval from the product sale date to the buyback request date is shorter than a predetermined expiry date (for example, when the buyback request date falls on Jan. 1, 2006), the buyback price amounts to '((product sale price−main/sub raw material price of product)×time interval from product sale date to buyback request date÷time interval from product sale date to expiry date)+main/sub raw material price of product'=((C4−C5)×(buyback request date−C2)÷(C3−C2))+C5=((₩1,000,000−₩500,000)×365÷730)+₩500,000=₩750,000.

If the time interval from product sale date to buyback request date is equal to the predetermined expiry date (for example, when the buyback request date falls on Jan. 1, 2007), the buyback price amounts to '((product sale price−main/sub raw material price of product)+main/sub raw material price of product×time interval from product sale date to buyback request date÷time interval from product sale date to expiry date)'=((C4−C5)+C5×(buyback request date−C2)÷(C3−C2))=((₩1,000,000−₩500,000)+₩500,000×730÷730)=₩1,000,000.

If the time interval from product sale date to buyback request date is longer than a predetermined expiry date (for example, when the buyback request date falls on Jan. 1, 2008), the buyback price amounts to 'product sale price+((product sale price−main/sub raw material price of product)×value increase rate (%)÷365×time interval from expiry date to buyback request date)'=C4+((C4−C5)×C6÷365×(buyback request date−C3))=₩1,000,000+((₩1,000,000−₩500,000)×4%÷365×365)=₩1,020,000.

Accordingly, the online buyback system allows an online buyback process to be performed between sellers and purchasers of products, such as precious metals or antiques, with no limitations in terms of time and space. In addition, after purchasing rare products such as precious metals or antiques, customers can be rewarded at a reasonable buyback price. Further, straight transactions of rare products such as precious metals or antiques can be conducted.

The online buyback system 100 may further include a member management unit 150.

The member management unit 150 receives member information including personal information and bank account of a buyback requester from a computer 200 of the buyback requester, conducts a member registration or modification process, and refers to the member information to conduct a member authentication process when the buyback requester accesses a network.

That is, the present embodiment provides a membership-based online buyback service. The above-mentioned member registration or modification and authentication processes are well-known in the art before application of the present invention and a detailed description thereof will thus be omitted herein.

In this case, the buyback processing unit 140 of the online buyback system 100 may pay the buyback price by making an online transfer of the buyback price from a bank account of the online buyback system 100 to a bank account of a buyback requester.

The online buyback system 100 may further include a purchase request information receiving unit 160 and a sale processing unit 170.

The purchase request information receiving unit 160 receives purchase request information including product identification information from a computer of a purchase requester accessing the network.

The sale processing unit 170 requests payment of a product price from the computer of purchase requester according to the purchase request information received by the purchase request information receiving unit 160, processes such that the product is sent to the purchase requester after the purchase requester pays for the product, and processes such that product sale information including product identification information, product specification, product sale price, and product sale date is stored in the database.

That is, according to the present embodiment, the online buyback system 100 is operatively associated with a product sale module of precious metals, antiques, and other products. The online buyback system 100 sells products through the sale processing unit 170 according to product purchase requests from users, and provides buyback services with respect to the sold products through the buyback processing unit 140.

In this case, the online buyback system 100 may provide membership-based services for product purchase and buyback through the member management unit 150. In addition, the online buyback system 100 may be configured such that the buyback processing unit 140 pays a buyback price by making an online transfer of the buyback price from a bank account of the online buyback system 100 to a bank account of a buyback requester, and such that the sale processing unit 170 receives a product price by making an online transfer of the product price from a bank account of a purchase requester to a bank account of the online buyback system 100. Accordingly, the online buyback system 100 may be configured to make online payment on product purchase and buyback processes.

FIG. 3 is a flow chart of product buyback operation in an online buyback system according to an embodiment of the present invention.

In operation S110, the online buyback system 100 collects product sale information including product identification information, product specification, product sale price, and product sale date of products sold online or offline and stores the product sale information in a database.

In operation S120, buyback request information including the product identification information is received from the computer 200 of a buyback requester accessing a network. In operation S130, the online buyback system 100 refers to the product sale information stored in the database to retrieve whether or not a product corresponding to the product identification information included in the buyback request information has been sold.

In operation S140, if the product is determined to have been sold out, the online buyback system 100 processes such that the product is collected from the buyback requester and a buyback price is paid to the buyback requester according to a time interval from product sale date to buyback request date.

While the present invention has been described with reference to exemplary embodiments thereof, it will be understood by those skilled in the art that various changes in form and details may be made therein without departing from the scope of the present invention as defined by the following claims.

INDUSTRIAL APPLICABILITY

The present invention can be effectively applied to an online buyback system.

The invention claimed is:

1. An online buyback system comprising:
 a database storing product sale information including product identification information, product specification, product sale price, an product sale date;
 a processor programmed to effectuate the operation of the following units:
 a buyback request information receiving unit receiving buyback request information including product identification information from a computer of a buyback requester accessing a network;
 a sale checking unit referring to the product sale information stored in the database to check whether or not a product corresponding to the product identification information contained in the buyback request information has been sold; and
 a buyback processing unit processing such that the product corresponding to the product identification information is collected from the buyback requester when the product is determined to have been sold, and a buyback price of the product is paid to the buyback requester based on a time interval, the time interval being calculated from the product sale date to buyback request date, wherein the buyback processing unit compares the time interval with a predetermined expiry date to determine an amount of the product buyback price to the buyback requester based on data calculated by the comparison, and
 wherein the product is a tangible product.

2. The online buyback system of claim 1, further including a member management unit receiving member information including personal information and bank account of a buyback requester from a computer of the buyback requester to perform member registration or modification process, and referring to the member information to perform member authentication process when the buyback requester accesses a network.

3. The online buyback system of claim 2, wherein the buyback processing unit processes such that the buyback price is paid to the buyback requester by making an online transfer of the buyback price from a bank account of the online buyback system to a bank account of the buyback requester.

4. The online buyback system of claim 3, further including:
   a purchase request information receiving unit receiving purchase request information including product identification information from a computer of a purchase requester accessing a network; and
   a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

5. The online buyback system of claim 4, wherein the sale processing unit receives the product price by accepting an online transfer of the product price from a bank account of the purchase requester to the bank account of the online buyback system.

6. The online buyback system of claim 1, further including a member management unit receiving member information including personal information and bank account of a buyback requester from a computer of the buyback requester to perform member registration or modification process, and referring to the member information to perform member authentication process when the buyback requester accesses a network.

7. The online buyback system of claim 6, wherein the buyback processing unit processes such that the buyback price is paid to the buyback requester by making an online transfer of the buyback price from a bank account of the online buyback system to a bank account of the buyback requester.

8. The online buyback system of claim 7, further including:
   a purchase request information receiving unit receiving purchase request information including product identification information from a computer of a purchase requester accessing a network; and
   a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

9. The online buyback system of claim 8, wherein the sale processing unit receives the product price by accepting an online transfer of the product price from a bank account of the purchase requester to the bank account of the online buyback system.

10. The online buyback system of claim 1, wherein when the time interval from product sale date to buyback request date is shorter than the predetermined expiry date, the buyback processing unit processes such that a buyback price of 'product sale price×buyback rate less than 100%' is paid.

11. The online buyback system of claim 10, further including a member management unit receiving member information including personal information and bank account of a buyback requester from a computer of the buyback requester to perform member registration or modification process, and referring to the member information to perform member authentication process when the buyback requester accesses a network.

12. The online buyback system of claim 11, wherein the buyback processing unit processes such that the buyback price is paid to the buyback requester by making an online transfer of the buyback price from a bank account of the online buyback system to a bank account of the buyback requester.

13. The online buyback system of claim 12, further including:
   a purchase request information receiving unit receiving purchase request information including product identification information from a computer of a purchase requester accessing a network; and
   a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

14. The online buyback system of claim 13, wherein the sale processing unit receives the product price by accepting an online transfer of the product price from a bank account of the purchase requester to the bank account of the online buyback system.

15. The online buyback system of claim 1, wherein when the time interval from product sale date to buyback request date is equal to the predetermined expiry date, the buyback processing unit processes such that a buyback price of 'product sale price×buyback rate of 100%' is paid.

16. The online buyback system of claim 15, further including a member management unit receiving member information including personal information and bank account of a buyback requester from a computer of the buyback requester to perform member registration or modification process, and referring to the member information to perform member authentication process when the buyback requester accesses a network.

17. The online buyback system of claim 16, wherein the buyback processing unit processes such that the buyback price is paid to the buyback requester by making an online transfer of the buyback price from a bank account of the online buyback system to a bank account of the buyback requester.

18. The online buyback system of claim 17, further including:
   a purchase request information receiving unit receiving purchase request information including product identification information from a computer of a purchase requester accessing a network; and
   a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

19. The online buyback system of claim 18, wherein the sale processing unit receives the product price by accepting an online transfer of the product price from a bank account of the purchase requester to the bank account of the online buyback system.

20. The online buyback system of claim 1, wherein when the time interval from product sale date to buyback request date is greater than the predetermined expiry date, the buyback processing unit processes such that a buyback price of 'product sale price×buyback rate greater than 100%' is paid.

21. The online buyback system of claim 20, further including a member management unit receiving member information including personal information and bank account of a buyback requester from a computer of the buyback requester to perform member registration or modification process, and referring to the member information to perform member authentication process when the buyback requester accesses a network.

22. The online buyback system of claim 21, wherein the buyback processing unit processes such that the buyback price is paid to the buyback requester by making an online transfer of the buyback price from a bank account of the online buyback system to a bank account of the buyback requester.

23. The online buyback system of claim 22, further including:
a purchase request information receiving unit receiving purchase request information including product identification information from a computer of a purchase requester accessing a network; and
a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

24. The online buyback system of claim 23, wherein the sale processing unit receives the product price by accepting an online transfer of the product price from a bank account of the purchase requester to the bank account of the online buyback system.

25. The online buyback system of claim 1, wherein when the time interval from product sale date to buyback request date is shorter than the predetermined expiry date, the buyback processing unit processes such that a buyback price of ((product sale price-main/sub raw material price of product× interval from product sale date to buyback request date/time interval from product sale date to expiry date)+main/sub raw material price of product is paid.

26. The online buyback system of claim 25, further including a member management unit receiving member information including personal information and bank account of a buyback requester from a computer of the buyback requester to perform member registration or modification process, and referring to the member information to perform member authentication process when the buyback requester accesses a network.

27. The online buyback system of claim 26, wherein the buyback processing unit processes such that the buyback price is paid to the buyback requester by making an online transfer of the buyback price from a bank account of the online buyback system to a bank account of the buyback requester.

28. The online buyback system of claim 27, further including:
a purchase request information receiving unit receiving purchase request information including product identification information from a computer of a purchase requester accessing a network; and
a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

29. The online buyback system of claim 28, wherein the sale processing unit receives the product price by accepting an online transfer of the product price from a bank account of the purchase requester to the bank account of the online buyback system.

30. The online buyback system of claim 1, wherein when the time interval from product sale date to buyback request date is equal to the predetermined expiry date, the buyback processing unit processes such that a buyback price of '((product sale price-main/sub raw material price of product)+main/sub raw material price of product×time interval from product sale date to buyback request date/time interval from product sale date to expiry date)' is paid.

31. The online buyback system of claim 30, further including a member management unit receiving member information including personal information and bank account of a buyback requester from a computer of the buyback requester to perform member registration or modification process, and referring to the member information to perform member authentication process when the buyback requester accesses a network.

32. The online buyback system of claim 31, wherein the buyback processing unit processes such that the buyback price is paid to the buyback requester by making an online transfer of the buyback price from a bank account of the online buyback system to a bank account of the buyback requester.

33. The online buyback system of claim 32, further including:
a purchase request information receiving unit receiving purchase request information including product identification information from a computer of a purchase requester accessing a network; and
a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

34. The online buyback system of claim 33, wherein the sale processing unit receives the product price by accepting an online transfer of the product price from a bank account of the purchase requester to the bank account of the online buyback system.

35. The online buyback system of claim 1, wherein when the time interval from product sale date to buyback request date is greater than the predetermined expiry date, the buyback processing unit processes such that a buyback price of 'product sale price+((product sale price−main/sub raw material price of product).times.value increase rate (%) of product/365×time interval from expiry date to buyback request date)' is paid.

36. The online buyback system of claim 35, further including a member management unit receiving member information including personal information and bank account of a buyback requester from a computer of the buyback requester to perform member registration or modification process, and referring to the member information to perform member authentication process when the buyback requester accesses a network.

37. The online buyback system of claim 35, wherein the buyback processing unit processes such that the buyback price is paid to the buyback requester by making an online transfer of the buyback price from a bank account of the online buyback system to a bank account of the buyback requester.

38. The online buyback system of claim 36, further including:

a purchase request information receiving unit receiving purchase request information including product identification information from a computer of a purchase requester accessing a network; and a sale processing unit requesting the computer of the purchase requester to pay the price for the product according to the purchase request information received by the purchase request information receiving unit, processing such that the product is sent to the purchase requester after the purchase requester pays for the product, and processing such that product sale information including product identification information, product specification, product sale price, and product sale date is stored in the database.

39. The online buyback system of claim 37, wherein the sale processing unit receives the product price by accepting an online transfer of the product price from a bank account of the purchase requester to the bank account of the online buyback system.

* * * * *